United States Patent
Park et al.

(10) Patent No.: US 9,640,309 B2
(45) Date of Patent: May 2, 2017

(54) SUPERCONDUCTING DC REACTOR

(71) Applicants: Minwon Park, Gimhae-si (KR); In-Keun Yu, Changwon-si (KR); Jin Geun Kim, Changwon-si (KR); Sang Jin Lee, Pohang-si (KR); Seock-Ho Kim, Changwon-si (KR); Sung-Kyu Kim, Changwon-si (KR); Young-Jin Won, Changwon-si (KR); Hak-Man Kim, Changwon-si (KR); Kyu-Won Jeong, Changwon-si (KR)

(72) Inventors: Minwon Park, Gimhae-si (KR); In-Keun Yu, Changwon-si (KR); Jin Geun Kim, Changwon-si (KR); Sang Jin Lee, Pohang-si (KR); Seock-Ho Kim, Changwon-si (KR); Sung-Kyu Kim, Changwon-si (KR); Young-Jin Won, Changwon-si (KR); Hak-Man Kim, Changwon-si (KR); Kyu-Won Jeong, Changwon-si (KR)

(73) Assignee: INDUSTRY-ACADEMIC COOPERATION FOUNDATION CHANGWON NATIONAL UNIVERSITY (KR)

( * ) Notice: Subject to any disclaimer, the term of this patent is extended or adjusted under 35 U.S.C. 154(b) by 0 days.

(21) Appl. No.: 14/374,846

(22) PCT Filed: Oct. 25, 2012

(86) PCT No.: PCT/KR2012/008806
§ 371 (c)(1),
(2) Date: Jul. 25, 2014

(87) PCT Pub. No.: WO2013/111942
PCT Pub. Date: Aug. 1, 2013

(65) Prior Publication Data
US 2015/0057158 A1    Feb. 26, 2015

(30) Foreign Application Priority Data

Jan. 26, 2012    (KR) .................. 10-2012-0007651

(51) Int. Cl.
*H01F 6/06*    (2006.01)
*H01F 37/00*   (2006.01)
(Continued)

(52) U.S. Cl.
CPC .............. *H01F 6/06* (2013.01); *H01F 27/34* (2013.01); *H01F 37/00* (2013.01); *H02M 1/12* (2013.01); *H02M 1/14* (2013.01)

(58) Field of Classification Search
CPC .................................. H01F 6/06; H02M 1/12
See application file for complete search history.

(56) References Cited

U.S. PATENT DOCUMENTS 4,151,498 A * 4/1979 Katsurai .................. 335/216
5,312,802 A * 5/1994 Hayashi et al. .......... 505/211
(Continued)

FOREIGN PATENT DOCUMENTS

JP    2006147821 A    6/2006
KR   2008-0089636    * 10/2008 ............ H01F 27/24

OTHER PUBLICATIONS

Machine translation of KR 2008-0089636 (2008).*
(Continued)

*Primary Examiner* — Paul Wartalowicz
(74) *Attorney, Agent, or Firm* — Porzio, Bromberg and Newman

(57) ABSTRACT

A DC reactor consisting of a coil formed of a superconducting material is provided. It is possible to reduce leakage reactance and to increase critical current by using a coil formed of a high temperature superconducting material and forming a first bobbin of the DC reactor as a toroid shape.

6 Claims, 3 Drawing Sheets

(51) Int. Cl.
H01F 27/34 (2006.01)
H02M 1/12 (2006.01)
H02M 1/14 (2006.01)

(56) References Cited

U.S. PATENT DOCUMENTS

| | | | |
|---|---|---|---|
| 5,412,363 A * | 5/1995 | Breneman et al. ........... | 335/216 |
| 7,646,272 B1 * | 1/2010 | Schmierer .......... | G01R 33/3802 |
| | | | 335/216 |
| 2008/0274897 A1 * | 11/2008 | Wiezoreck et al. .......... | 505/166 |
| 2009/0278647 A1 | 11/2009 | Buswell | |
| 2010/0323900 A1 | 12/2010 | Kawashima | |

OTHER PUBLICATIONS

Machine translation of JP 2006-147821 (2006).*
Park et al. "Effective Design of Toroid-type Medium Size HTS DC Reactor for HVDC Transmission System." Physics Procedia 00 (2011) 000-000.

* cited by examiner

SUPERCONDUCTING DC REACTOR

TECHNICAL FIELD

The following description relates in general to a DC reactor consisting of a coil formed of superconducting material. A DC reactor is configured to reduce leakage reactance and increase critical current of the DC reactor, by using a high temperature superconducting coil and limiting a shape of a first bobbin into a toroid.

DESCRIPTION OF RELATED ART

For about 100 years, an AC (Alternating Current) transmission system capable of easily changing voltage when producing, conveying or selling electricity has been used. However, according to a recent trend regarding the semiconductor switching device, a convertor is available which can change a high voltage AC to high voltage DC. Accordingly, many studies are suggested for direct current transmission system. Thanks to such studies, an HVDC (Hyper Voltage Direct Current) transmission system has been developed.

The HVDC (Hyper Voltage Direct Current) transmission system is characterized in that a high voltage AC power is transmitted by being converting into high voltage DC by means of a converter that uses a semiconductor switching device. The HVDC transmission system provides many advantages over the AC transmission system. First, the DC voltage has a magnitude of 70% as compared to a maximum value of the AC voltage. Thus, it is easy to insulate the device. Further, a voltage is low so that the number of insulators and a height of a steel-tower installed with respect to an individual device may be reduced. Second, in cases where the same power is transmitted, the transmission efficiency of a DC method is better than that of an AC method due to small loss in transmitting. It is impossible to remarkably change voltage during transmitting by the conventional DC method, accordingly transmission loss is increased. To account for the development of the HVDC transmission system, a high voltage DC voltage is available thereby the transmission efficiency becomes good. Furthermore, transmission distance is not restricted in this regard. With respect to power transmission on land of 500 km or more or power transmission into the seabed of 40 km or more, construction costs of the DC transmission system are inexpensive as compared to those of the AC transmission system.

FIG. 1 is a diagram illustrating an example of an HVDC transmission system including a conventional DC reactor.

As shown in FIG. 1, the HVDC transmission system requires a DC reactor at a DC transmission line. The DC reactor absorbs invalid power by using a large induction reactance with respect to the AC circuit. With specific regards to an inverter, i.e., an AC-DC power converter, the DC reactor acts for the AC current of 3-phase rectified circuit, to reduce current ripple for which AC is converted to DC and to reduce harmonics. Through such DC reactor, waveform of current is improved and a power factor is improved.

The HVDC transmission system is a technology configured to transmit a high voltage DC/AC. A DC reactor used in the HVDC transmission system is required to have a large inductance. In other words, the DC reactor needs to have large-capacity. A copper coil is used to form the conventional large capacity DC reactor which drains lot of power due to resistance of the copper. Additionally, the entire volume and weight of the DC reactor are significantly large.

Korean Patent Application Laid-open No. 10-2004-0108474 discloses a DC reactor using a superconductive tape winding. However, there is no description regarding a technical method to improve inductance of the DC reactor.

DISCLOSURE

Technical Problem

In order to solve the aforementioned problems of the relate art, an aspect of the present example provides a DC reactor effectively applicable for the HVDC transmission system, by reducing current loss due to resistance of coil inside the DC reactor.

The present example provides a DC reactor having light volume and weight, in comparison with the conventional DC reactor used for the HVDC transmission system.

Technical Solution

In order to achieve the aspect, a superconducting DC reactor configured to reduce output current ripple and harmonics of an AC-DC converter, the superconducting DC reactor includes a first bobbin in a toroid shape having a certain thickness that forms an overall shape of the DC reactor; and coil blocks that are spaced apart from one another and surround the outer peripheral face of the first bobbin. The coil block includes a second bobbin that has a hollow internal portion in a cylindrical shape and surrounds the first bobbin; a high temperature superconducting coil that winds the outer peripheral face of the second bobbin; and a prevention disc plate that is disposed at both ends of the second bobbin so that the high temperature superconducting coil may wind without deviating from the second bobbin and has an outer diameter larger than an outer diameter of the second bobbin.

Preferably, the first bobbin is made of a coreless material having a low magnetic permeability.

The high temperature superconducting coil may be a material selected from a BSCCO (bismuth strontium calcium copper oxide) or a YBCO (Yttrium Barium Copper Oxide).

The outer peripheral face of the second bobbin is wound by the high temperature superconducting coil by way of a double-pancake coil.

Preferably, the prevention disc plate is made of aluminum material.

The prevention disc plate may have an inner diameter at which the first bobbin can penetrate.

Advantageous Effects

The DC reactor described in the present example is applicable to the HVDC transmission system because the DC reactor reduces current loss due to resistance of coil inside the DC reactor.

The DC reactor illustrated in the present example is convenient to use because the volume and weight are reduced in comparison with the conventional DC reactor used for the HVDC transmission system.

Figure 1:
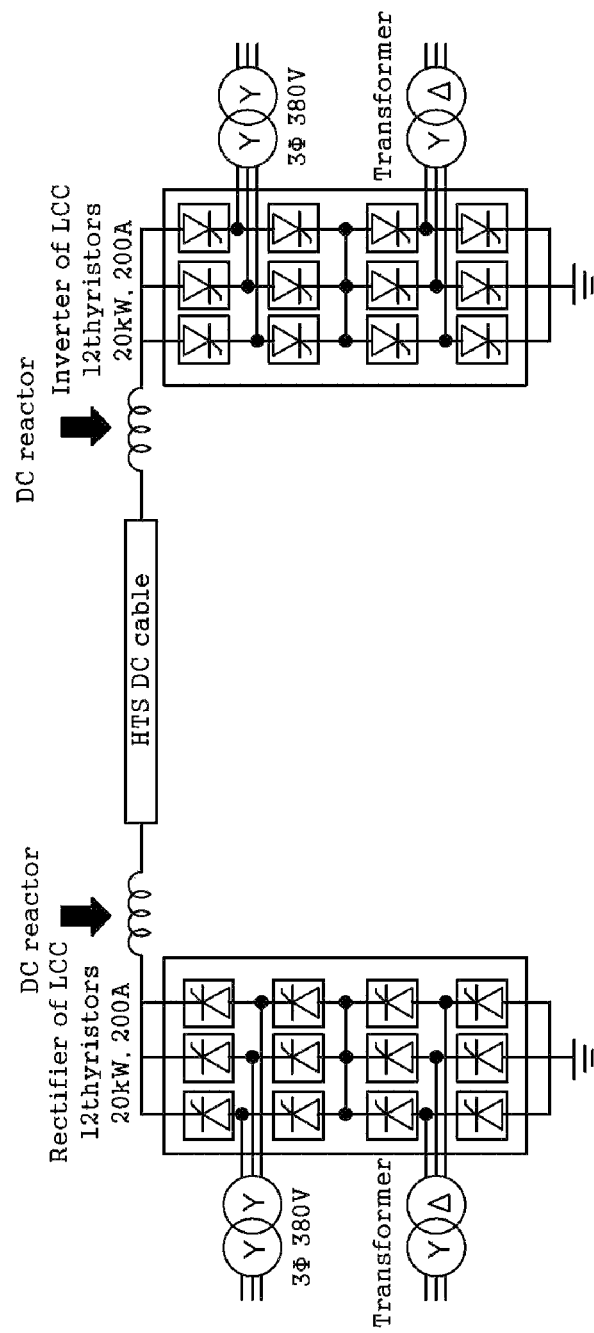
FIG. 1 is a diagram illustrating an example of an HVDC transmission system including the conventional DC reactor.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

BEST MODE

The following description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art. It will be understood that, although the terms first, second, etc. may be used herein to describe various elements, these elements should not be limited by these terms.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present disclosure will be described in detail below.

Figure 2:
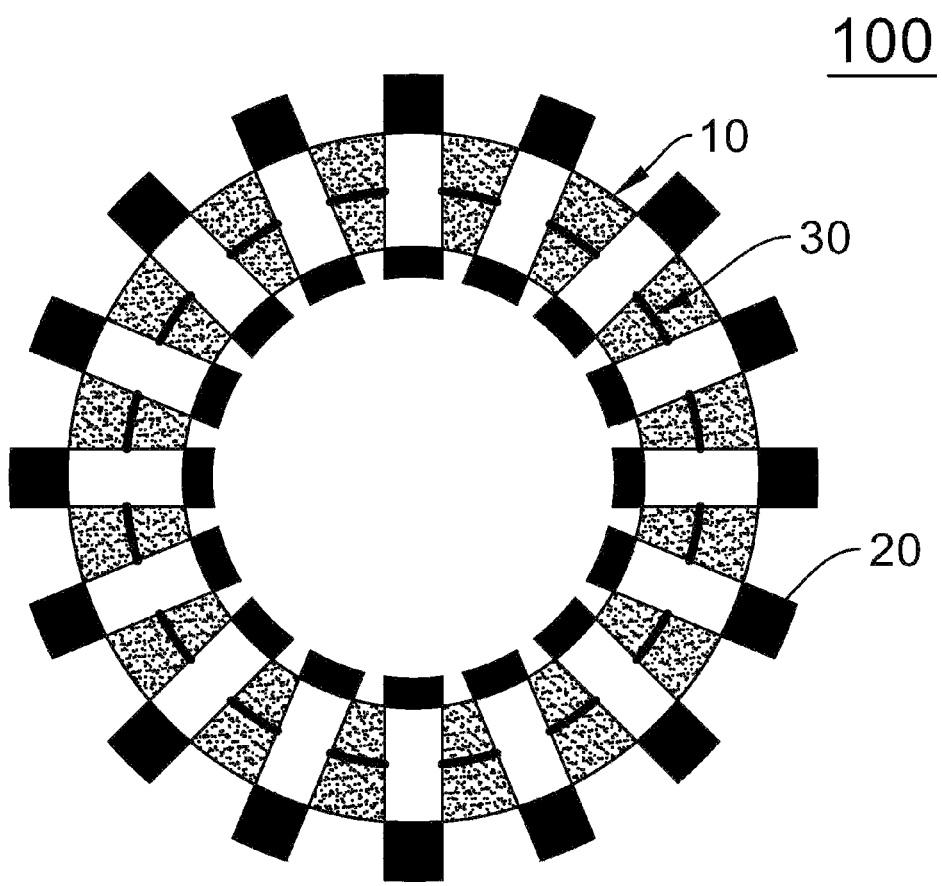
FIG. 2 is a diagram illustrating an example of a DC reactor according to the present example.

FIG. 2 is a diagram illustrating an example of a superconducting DC reactor. As shown in FIG. 2, a superconducting DC reactor configured to reduce output current ripple and harmonics of an AC-DC converter, the superconducting DC reactor 100 includes a first bobbin 10 that is in a toroid shape and forms an overall shape of the DC reactor; and coil blocks 20 that are spaced apart from one another and surround the outer peripheral face of the first bobbin 10. The coil block 20 includes a second bobbin that has a hollow internal portion in a cylindrical shape and surrounds the first bobbin 10; a high temperature superconducting coil that winds the outer peripheral face of the second bobbin; and a prevention disc plate that is disposed at both ends of the second bobbin so that the high temperature superconducting coil may wind without deviating from the second bobbin and has an outer diameter larger than an outer diameter of the second bobbin.

The first bobbin 10 is shaped in a toroid and forms an overall shape of the DC reactor. The first bobbin 10 penetrates a coreless coil block 20 and forms the coil block 20 which is spaced apart with a certain interval. In the present example, the first bobbin 10 is shaped in a toroid and the superconducting DC reactor 100 including the first bobbin 10 becomes toroid generally. The superconducting DC reactor 100 in toroid shape weakens a magnitude of an external magnetic field as compared to a magnitude of an external magnetic field of a solenoid.

In the present example, the superconducting DC reactor 100 consists of a coil 22 formed of high temperature superconducting material, instead of the conventional copper coil. According to the properties of the high temperature superconducting coil 22, a magnitude of the critical current with an inherent property of superconductor is inversely proportional to a magnitude of the external magnetic field. Specifically, a magnitude of the critical current is inversely proportional to a magnitude of a magnetic field of a surface of the high temperature superconducting coil 22 as vertical component. The present example adopts a high temperature superconducting coil 22 instead of a copper coil with regards to the superconducting DC reactor 100 and includes a first bobbin 10 in a toroid shape that constitutes the overall shape of the superconducting DC reactor. Thus, the high temperature superconducting coil 22 has a relatively large critical current. The properties and characteristics of the high temperature superconducting coil 22 will be described in detail later.

The first bobbin 10 may consist of a material having a low magnetic permeability. Preferably, the first bobbin 10 may be a coreless material having a low magnetic permeability. As discussed above, the critical current of the high temperature superconducting coil 22 is inversely proportional to a magnitude of the magnetic field formed outside. The present example is such that the first bobbin 10 consists of a coreless material having a low magnetic permeability. Thus it is possible to weaken a magnitude of the external magnetic field generated from the current flow of the coil 22. In some examples, a nonmagnetic body such as an FRP or a nonconductor may be used as a material of the first bobbin 10. One skilled in the art will readily appreciate that the material of the first bobbin 10 is created without materially departing from the present inventive concept.

The coil block 20 is spaced apart with a certain interval and surrounds the outer peripheral face of the first bobbin 10. Referring to FIG. 2, the superconducting DC reactor 100 consists of a first bobbin 10 and a total of sixteen coil blocks 20. This example is to be considered in a descriptive sense only, and not for purposes of limitation. In some examples, the superconducting DC reactor 100 may consist of a first bobbin 10 and a total of sixty coil blocks 20. Those skilled in the art will appreciate that the number of coil blocks 20 is created without materially departing from the present inventive concept when applying the superconducting DC reactor 100 in the HVDC transmission system at various environmental conditions.

Figure 3A:
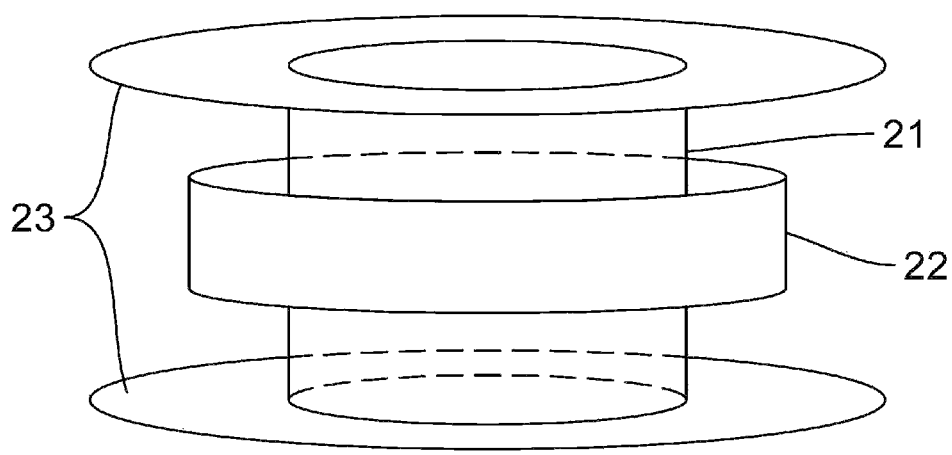
FIG. 3 is a diagram illustrating an example of an overall view and a cross-sectional view of a coil block according to the present example.
Figure 3B:
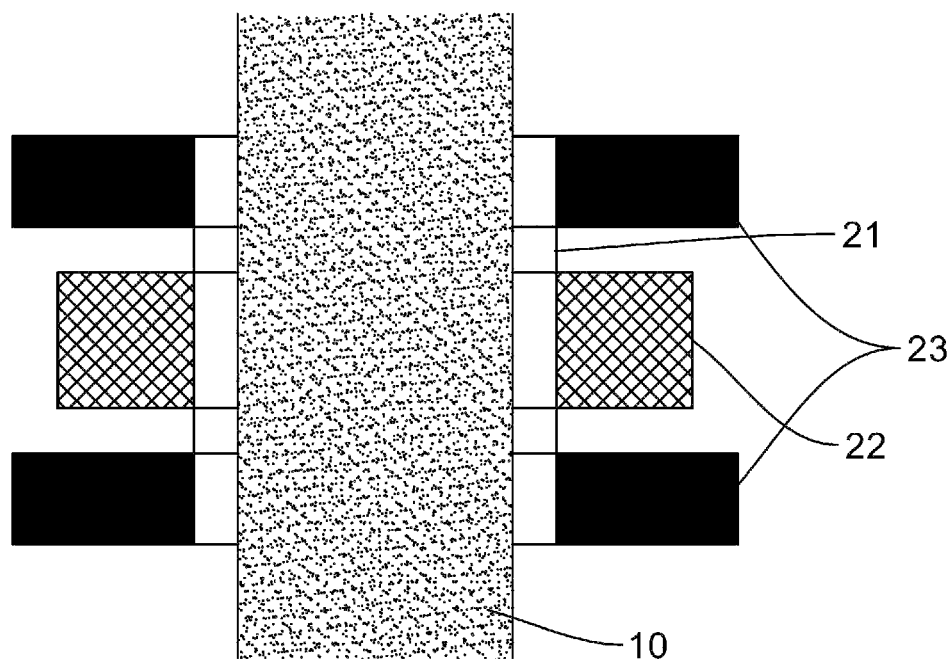

FIG. 3 is a diagram illustrating an example of an overall view and a cross-sectional view of a coil block according to the present example.

As shown in FIG. 3, the coil block 20 consists of a second bobbin 21, a high temperature superconducting coil 22, and a prevention disc plate 23. Each component of the coil block 20 will be described in detail.

The second bobbin 21 has a hollow internal portion in a cylindrical shape and surrounds the first bobbin 10. That is, the second bobbin 21 is penetrated by the first bobbin 10. Here, an inner diameter of the second bobbin 21 may be the same as or greater than a thickness of the first bobbin 10. In some examples, possibly, an inner diameter of the second bobbin 21 is such that the first bobbin may easily penetrate the second bobbin. Further, the second bobbin 21 may have a size enough to be affixed to the first bobbin 10.

The second bobbin 21 acts as an axis with respect to the high temperature superconducting coil 22 that winds the outer peripheral face of the second bobbin 21. More particularly, the high temperature superconducting coil 22 is realized in a tape form. The second bobbin 21 acts as an axis so that such high temperature superconducting coil 22 manufactured in tape form may wind in various winding methods.

Further, the second bobbin 21 enables identification per unit of coil block 20 by guiding the high temperature superconducting coil 22 not to wind directly the first bobbin 10. The coil block 20 is easily detached from the first bobbin 10.

In some examples, the second bobbin 21 may be a cylindrical shape having a width wider than a width of the high temperature superconducting coil 22, the internal portion of which is hollow. Here, if the width of the second bobbin 21 is smaller than that of the high temperature superconducting coil 22, the high temperature superconducting coil 22 cannot wind the outer peripheral face of the second bobbin 21. Further, if the width of the second bobbin 21 is too larger than the width of the high temperature superconducting coil 22, the high temperature superconducting coil 22 is not potentially affixed. In view of above, the present example illustrates the second bobbin 21 in a cylindrical shape having a width suitable for affixation of the high temperature superconducting coil 22, the internal portion of which is hollow.

In some examples, the second bobbin 21 may be a cylindrical shape which is curved to below a curvature of the first bobbin 10. The first bobbin 10 is annular shape and has a certain curvature. Accordingly, the second bobbin 21 may be a cylindrical shape having a certain curvature so that the second bobbin can be easily affixed to the first bobbin 10. Those skilled in the art will appreciate that such form of the second bobbin 21 is created without materially departing from the present inventive concept.

In yet some examples, the second bobbin 21 may consist of an insulator. Preferably, the second bobbin 21 consists of an FRP material which has superior electrical-insulating nature and thermal resistance. The second bobbin 21 consisting of the FRP material provides effects of preventing current which flows with respect to the high temperature superconductive foil 22 from leakage. The material of the second bobbin 21 is not limited thereto.

The high temperature superconducting coil 22 is a coil made of High Temperature Superconductor (HTS). The high temperature superconducting coil 22 may include all the materials exhibiting superconductivity even at a relatively high temperature. Superconductivity is a phenomenon that a material has magnetic property for which electric resistance of the material completely disappears during a specific situation and property of percent diamagnetism that excludes a magnetic field. The name 'super' conductor is given since the electrical conductivity of the superconductor is the best of all well known materials due to the electric resistance of "0". Suitable conditions for the superconductor may be temperature, magnetic field, and current. A phenomenon that a material which does not exhibit superconductivity at room temperature changes to a superconductor at a suitable condition is referred to as a transition from the normal state into the superconductive state. Specifically, where the superconductor does not have the external magnetic field and the conduction current at a thermodynamic superconduction condition, the highest temperature showing superconductivity is referred to as a critical transition temperature. The superconductive material has the unique critical transition temperature according to the type of the material. Typical low-temperature superconductors have the critical transition temperature of 20K or less. The high-temperature superconductive material has a relatively high critical transition temperature of 70K or more.

The high temperature superconducting coil 22 may consist of a BSCCO (Bismuth Strontium Calcium Copper Oxide). The BSCCO is referred to simply as Bisco or Bi-2212, and has a formula of $Bi_2Sr_2CaCu_2O_{8+\delta}$. The BSCCO has a critical transition temperature relatively higher than the conventional superconductor based on a ceramic material having formula of Bi—Sr—Ca—Cu—O.

In some examples, the high temperature superconducting coil 22 may consist of a YBCO(Yttrium Barium Copper Oxide). The YBCO is an acronym of Yttrium Barium Copper Oxide and has a formula of $YBa_2Cu_3O_{7-x}$. The YBCO is one of superconductors and has a relatively high critical temperature of 90K to 93K. The YBCO pertains to relatively economical superconductive alloy.

The high temperature superconducting coil 22 has a current density higher than a current density of other materials. By using the high temperature superconducting coil 22, a current capacity is increased substantially higher than the DC reactor using the conventional copper coil. In response to such properties of the high temperature superconducting coil 22, volume and weight of the DC reactor are decreased. As discussed above, the present example provides a first bobbin in toroid shape which weakens a magnitude of an external magnetic field. The critical current of the high temperature superconducting coil 22 is inversely proportional to the external magnetic field. It follows that a critical current of the coil 22 obtained from the weak external magnetic field becomes bulky. A maximum amount of current transmitted via the coil 22 increases and current capacity increases accordingly.

Further, the high temperature superconducting coil 22 is characterized in that the resistance is close to 0 at under certain temperature. This suggests that the amount of electricity consumption caused from the resistance can be reduced by using the coil 22 as compared to the conventional one.

The high temperature superconducting coil 22 is formed of a fragile metallic oxide ceramic and is manufactured as joist in a tape shape having metal coating material. Preferably, the coil 22 winds by way of a double-pancake coil. Here, the high temperature superconducting coil 22 may wind by any one of a pancake coil, a fan-shaped coil, a racetrack coil, a double pancake coil. The present example is not specifically restricted to the process of winding with respect to the high temperature superconducting coil 22.

Here, the high temperature superconducting coil 22 is influenced by tensile strength, bending stress, direction of stress, electrically and mechanically. When winding, if a superconductive wire material is not wound uniformly due to flux or motion of the second bobbin 21, the superconductivity is decreased or becomes unstable. In the present example, the second bobbin 21 is uniformly wound by the high temperature superconducting coil 22 while minimizing the damage with regards to the coil.

The prevention disc plate 23 is disposed at both ends of the second bobbin 21 so that the high temperature superconducting coil 22 may wind without deviating from the second bobbin 21 and has an outer diameter larger than an outer diameter of the second bobbin 21. Specifically, the prevention disc plate 23 acts to affix the high temperature superconducting coil 22 to wind the second bobbin 21. In some examples, a magnitude of inner diameter of the prevention disc plate 23 may be the same as that of the second bobbin 21. However, the present example is not limited thereto. Further, a magnitude of inner diameter of the prevention disc plate 23 is different from a magnitude of the inner diameter of the second bobbin 21 but may be various to affix the high temperature superconducting coil 22. Those skilled in the art will appreciate that the form of the prevention disc plate 23 is created without materially departing from the present inventive concept.

The prevention disc plate 23 acts to conduct and cool the high temperature superconducting coil 22 when the temperature of the high temperature superconducting coil 22 is increased by an excess current. Specifically, when the excess current flows in the coil 22, the temperature is increased. When the temperature of the coil reaches the critical transition temperature, the coil 22 is quenched and loses the superconductivity. In order to prevent such phenomenon, the prevention disc plate 23 is configured to sustain the coil 22 at a certain temperature by delivering heat generated when the temperature of the coil 22 is increased. This suggests that the prevention disc plate 23 may consist of a material having high heat conductivity.

The prevention disc plate 23 may consist of aluminum. The aluminum material is characterized of the excellent thermal conductivity, lightness, and low magnetic permeability. Thus, it is easy to conduct and cool the high temperature superconducting coil 22. Further, it is possible to weaken a magnitude of the magnetic field generated when the current flows with respect to the coil 22. In some examples, the prevention disc plate 23 may consist of other materials having excellent thermal conductivity and low magnetic permeability. Those skilled in the art will appreciate that a material of the prevention disc plate 23 is created without materially departing from the present inventive concept.

The above-discussed coil blocks 20 may be connected to an interlinking member 30 in which the current may flow. Here, the interlinking member 30 consists of a material which conducts electric current. Since the capacity of the current of the coil 22 inside the coil block 20 is bulky, an unintentional exothermic reaction possibly occurs where a conductor other than a superconductor is used as the interlinking member 30. Thus, the interlinking member 30 may consist of a material such as the high temperature superconducting coil 22. However, the present example is not limited thereto.

While this disclosure includes specific examples, it will be apparent to one of ordinary skill in the art that various changes in form and details may be made in these examples without materially departing from the present inventive concept. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A superconducting DC reactor configured to reduce output current ripple and harmonics of an AC-DC converter, the superconducting DC reactor comprising:
    a plurality of coil blocks that are spaced apart from one another and is formed in a toroid shape an overall shape of the DC reactor; and
    a interlinking member connecting two or more of the coil blocks to each other,
    wherein the coil block comprises:
    a first bobbin made of a coreless material;
    a second bobbin that has a hollow internal portion in a cylindrical shape and surrounds the first bobbin;
    a high temperature superconducting coil that winds an outer peripheral face of the second bobbin; and
    a prevention disc plate with a larger outer diameter disposed at both ends of the second bobbin so the high temperature superconducting coil may wind without deviating from the second bobbin and delivering heat generated from the high temperature superconducting coil outside, wherein the second bobbin acts as an axis with respect to the high temperature superconducting coil, and the interlinking member consists of the same material as the high temperature superconducting coil.

2. The superconducting DC reactor of claim 1, wherein the first bobbin is made of the coreless material has a low magnetic permeability.

3. The superconducting DC reactor of claim 1, wherein the high temperature superconducting coil is made of a material selected from a BSCCO (bismuth strontium calcium copper oxide) or a YBCO (Yttrium Barium Copper Oxide).

4. The superconducting DC reactor of claim 1, wherein the outer peripheral face of the second bobbin is wound by the high temperature superconducting coil by way of a double-pancake coil.

5. The superconducting DC reactor of claim 1, wherein the prevention disc plate is made of aluminum material.

6. The superconducting DC reactor of claim 1, wherein the prevention disc plate has an inner diameter at which the first bobbin can penetrate.

* * * * *